(12) United States Patent
Nanbu et al.

(10) Patent No.: US 7,619,334 B2
(45) Date of Patent: Nov. 17, 2009

(54) MOTOR HAVING A HIGHLY RELIABLE GROUNDING STRUCTURE AND ELECTRIC EQUIPMENT ON WHICH THE MOTOR IS MOUNTED

(75) Inventors: Yasuo Nanbu, Fukui (JP); Masahiko Morisaki, Fukui (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 10/547,180

(22) PCT Filed: Mar. 29, 2004

(86) PCT No.: PCT/JP2004/004397

§ 371 (c)(1), (2), (4) Date: Aug. 29, 2005

(87) PCT Pub. No.: WO2004/088818

PCT Pub. Date: Oct. 14, 2004

(65) Prior Publication Data

US 2006/0175917 A1 Aug. 10, 2006

(30) Foreign Application Priority Data

Mar. 31, 2003 (JP) ............................. 2003-094944

(51) Int. Cl.
*H02K 11/00* (2006.01)
(52) U.S. Cl. .................. 310/71; 310/216.074; 310/43
(58) Field of Classification Search .................. 310/71, 310/43, 216.074
See application file for complete search history.

(56) References Cited

U.S. PATENT DOCUMENTS 4,544,856 A * 10/1985 King ........................... 310/71
6,028,383 A * 2/2000 Ohshita ........................ 310/71
6,664,696 B1 * 12/2003 Pham et al. .................. 310/216
7,309,936 B2 * 12/2007 Utsumi et al. ................. 310/71
2003/0127921 A1 * 7/2003 Akutsu et al. ............. 310/68 R
2003/0222531 A1 * 12/2003 Akutsu et al. ............... 310/218
2007/0007834 A1 * 1/2007 Teshima et al. ............... 310/71

FOREIGN PATENT DOCUMENTS

| JP | 56-30562 | | 3/1981 |
| JP | 59165938 | A * | 9/1984 |
| JP | 02294251 | A * | 12/1990 |
| JP | 04038145 | A * | 2/1992 |

(Continued)

OTHER PUBLICATIONS

US english translation of JP 04038145 A, Takamatsu, Junichi, Resin Molded Motor, Feb. 7, 1992, All pages.*

*Primary Examiner*—Quyen Leung
*Assistant Examiner*—Naishadh N Desai
(74) *Attorney, Agent, or Firm*—Wenderoth, Lind & Ponack, L.L.P.

(57) ABSTRACT

This motor has a stator formed by integrally molding a stator core, a stator winding wound around the stator core, and a grounding terminal mounted on the stator winding by insulating resin. The motor has a rotor provided with a shaft, a bracket mounting a bearing for supporting the shaft, and a conductive pin press fit in at least one hole having a predetermined diameter provided in the teeth of the stator core. The pin and the grounding terminal are electrically connected to each other.

10 Claims, 7 Drawing Sheets

FOREIGN PATENT DOCUMENTS

| | | | |
|---|---|---|---|
| JP | 5-21419 | | 3/1993 |
| JP | 05184092 A | * | 7/1993 |
| JP | 05199691 A | * | 8/1993 |
| JP | 7-184333 | | 7/1995 |
| JP | 07184333 A | * | 7/1995 |
| JP | 8-275458 | | 10/1996 |
| JP | 08275458 A | * | 10/1996 |
| JP | 11-75337 | | 3/1999 |
| JP | 33055379 | * | 9/2002 |
| JP | 2006333540 A | * | 12/2006 |

* cited by examiner

MOTOR HAVING A HIGHLY RELIABLE GROUNDING STRUCTURE AND ELECTRIC EQUIPMENT ON WHICH THE MOTOR IS MOUNTED

This application is a U.S. national phase application of PCT International Application PCT/JP2004/004397.

TECHNICAL FIELD

The present invention concerns a motor having an accurate grounding structure and suitable for mounting on electric equipment intended for using water such as a washing machine, a dish washer, etc., and electric equipment on which the motor, is mounted.

BACKGROUND ART

A motor used as a drive source for a drainage pump of a washing machine, a washing pump of a dish washer, etc., is desired to have a highly reliable grounding structure because it is a product used near wet environments.

Conventionally, a so-called molded motor the stator of which is formed of a resin, is often used as a motor to be mounted on electric equipment intended for using water such as a washing machine, a dish washer, etc. In the case where the type of the molded motor is an induction motor with an inserter winding system, the grounding structure of the motor can be realized comparatively easily in a structure as described below. Namely, it is a structure in which a groove is provided on the outside diameter side of the stator core of the motor, so as to insert a grounding terminal in the groove, integrally mold them, and dispose the tip of the grounding terminal on the outside of the motor.

Figure 7:
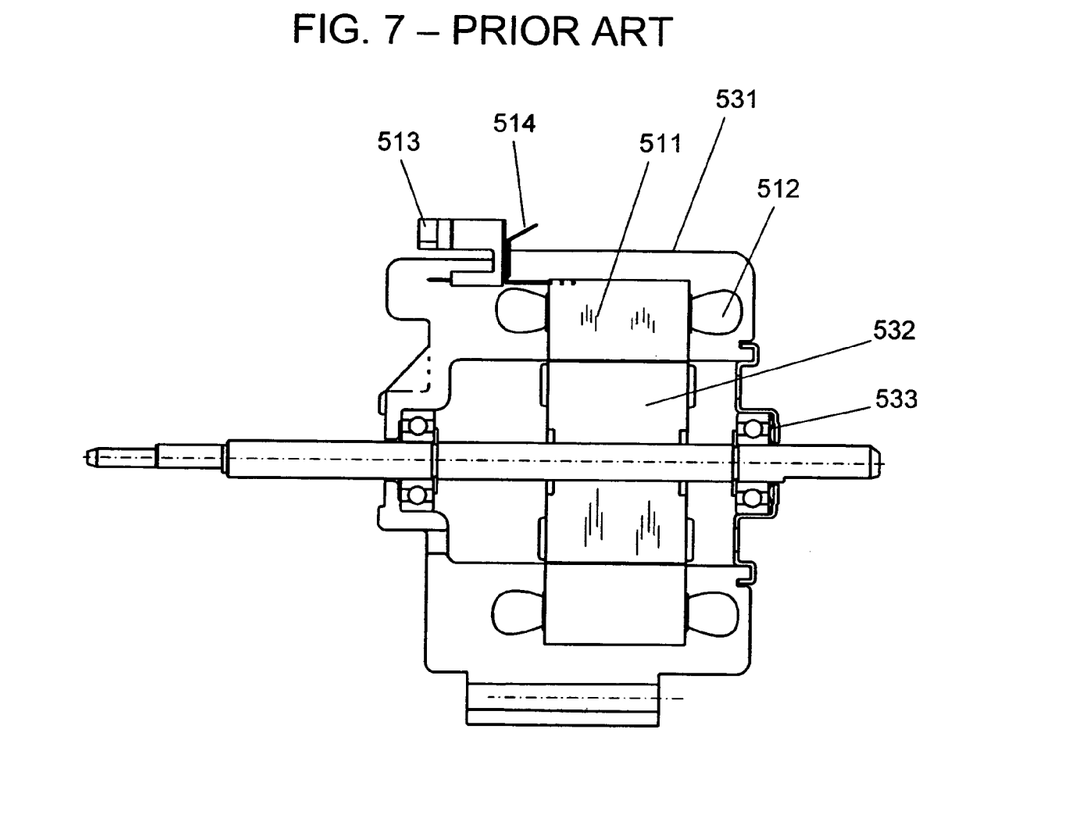
FIG. 7 is a structural sectional view of a conventional molded motor.

This conventional grounding structure is explained with reference to a drawing. FIG. 7 is a structural sectional view of a conventional molded motor.

In FIG. 7, on stator core 511, stator winding 512 is inserted in a slot (not shown) from the inside diameter side of stator core 511. Grounding terminal 514 is press fitted in the groove provided on the outside diameter side of stator core 511, and is molded by resin 531 forming the outer covering. The tip of grounding terminal 514 is exposed outside of resin 531 for connection with the grounding wire from the equipment side. Connector 513 is intended for connection with the wiring for power supply from the equipment to stator winding 512, and a part of this connector is fixed by molding with resin 531. Moreover, rotor 532, on which is mounted a shaft, is disposed on the inside of stator core 511. Bracket 533 mounting a bearing for supporting the shaft is fixed to the end face on one side of the stator.

Furthermore, another grounding structure is disclosed on Japanese Laid-Open Patent Application No. H11-75337. Namely, a method is known which consists of connecting the stator core and the bracket to the earth by means of a conductive elastic body, on a molded motor by mounting a conductive bracket by press fitting, on the end face in axial direction of a stator constructed by integrally molding the stator core and the stator winding wound around the stator core.

As still another grounding structure, a method is known which consists in connecting a pin, which is a rigid body, by pinching it between the stator core and the bracket.

However, in the case of a toroidal motor the stator winding of which is wound toward the outside diameter from a slot in the stator core, in particular, it is difficult to make the terminal come out from the outside diameter side of the stator core,

2 because the stator winding is also wound on the outside diameter side of the stator core.

Still more, with only pinching of an elastic body, such as spring, etc., or a pin, which is a rigid body between the stator core and the bracket, the pinched part is in a state of point contact between the two, and the accuracy of the contact is low. For this reason, there is a risk of the contact becoming unstable because of secular change, etc., and therefore, its reliability as a grounding structure is rather low.

DISCLOSURE OF THE INVENTION

A motor according to the present invention is constructed by comprising:

(a) a stator formed by integrally molding a stator core, a stator winding wound around the stator core, and a grounding terminal mounted on the stator winding by means of an insulating resin, (b) a rotor provided with a shaft, (c) a bracket mounting a bearing for supporting the shaft, and (d) a conductive pin press fit in at least one hole having a predetermined diameter provided in the teeth of the stator core. The pin and the grounding terminal are electrically connected to each other.

This construction enables one to realize a motor having a highly reliable grounding structure.

DETAILED DESCRIPTION OF THE PREFERRED EMBODIMENTS

The motor in the embodiment of the present invention has a stator formed by integrally molding a stator core, a stator winding wound around the stator core, and a grounding terminal mounted on the stator winding by an insulating resin; a rotor provided with a shaft; a bracket mounting a bearing for supporting the shaft; and a conductive pin press fit in at least one hole having a predetermined diameter provided in the teeth of the stator core. The pin and the grounding terminal are electrically connected to each other. This construction enables one to realize a motor having a highly reliable grounding structure.

As a concrete embodiment of the present invention, a case where the motor is a toroidal motor is explained below.

Figure 1:
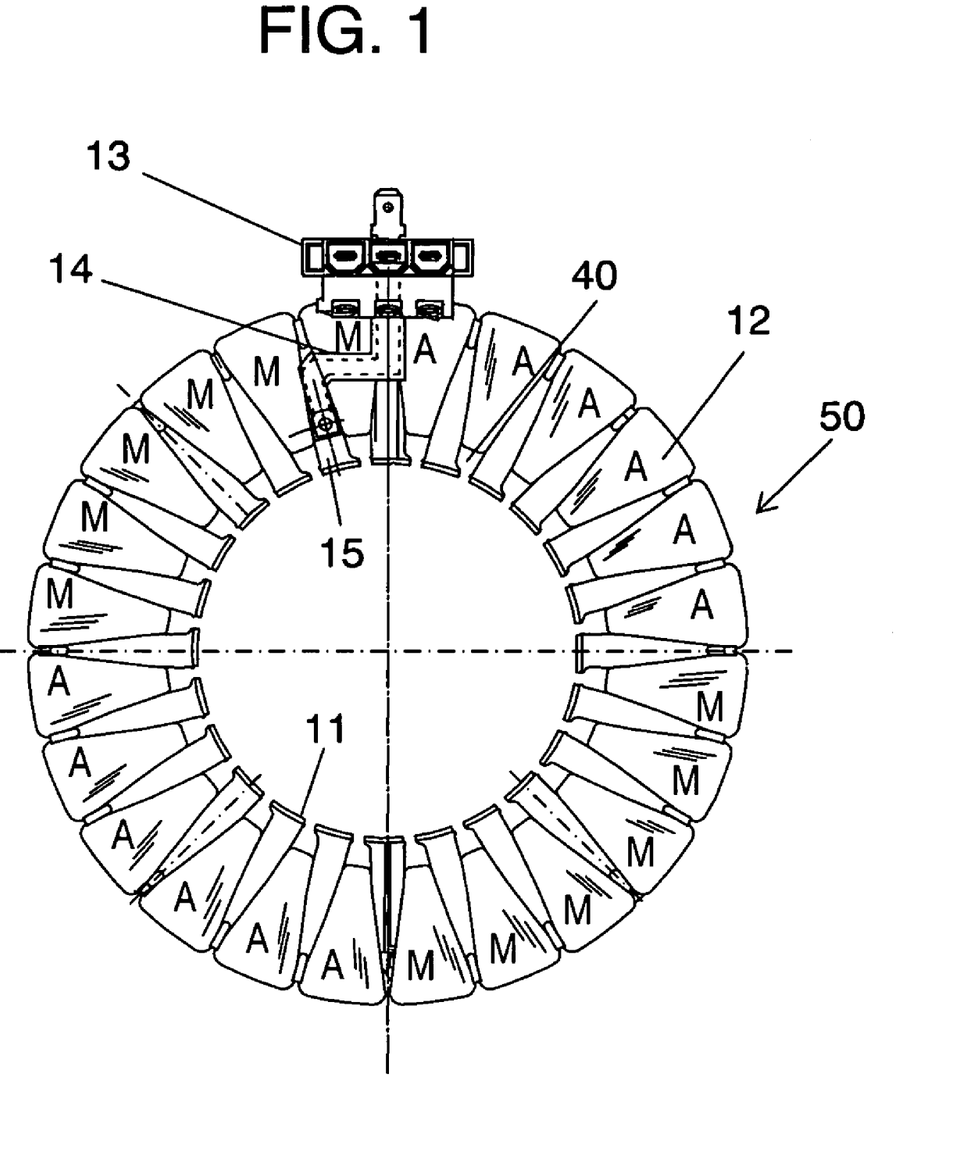
FIG. 1 indicates a complete product of a winding of a troidal motor in an embodiment of the present invention.

FIG. 1 indicates a complete product of a winding of the toroidal motor (hereinafter referred to as motor) in an embodiment of the present invention, constructed as follows:

Stator core 11 of stator 50 is formed by laminating a plurality of electromagnetic steel sheets. Stator core 11 has 24 pieces of teeth 15 formed in a way to protrude to the inside diameter side, a yoke connecting such teeth, and 24 pieces of slot 40 formed between mutually adjacent teeth. Stator core 11 is provided with insulation for securing electric insulation from stator winding 12 wound around stator core 11. Stator winding 12 is wound from slot 40 of stator core 11 toward the outside diameter of stator core 11. After the winding, connector 13 and grounding terminal 14 are mounted on stator winding 12. Connector 13 connects the wiring for feeding electric power from the equipment side to stator winding 12, and the grounding wire from the equipment side. "M" given in FIG. 1 indicates a main winding, and "A" indicates an auxiliary winding.

Of the three terminals on the equipment side of connector 13, the two terminals on both sides are terminals for connecting the power feed line from the equipment side to the motor, and one terminal at the center is a terminal for connecting the grounding wire from the equipment side. Moreover, of the three terminals on the motor side of connector 13, the two terminals on both sides are connected the main winding on one side and the auxiliary winding on the other side. Furthermore, the right side terminal on the equipment side and the right side terminal on the motor side are electrically connected to each other and, similarly, the left side terminal on the equipment side and the left side terminal on the motor side are electrically connected to each other.

One side of grounding terminal 14 protrudes to the outside of connector 13, via the central terminal on the motor side and the central terminal on the equipment side of connector 13. The other side of grounding terminal 14 is bent in the shape of a crank, and its tip part is electrically connected to teeth 15 of stator core 11 through conductive pin 21 indicated in FIG. 2.

Figure 2:
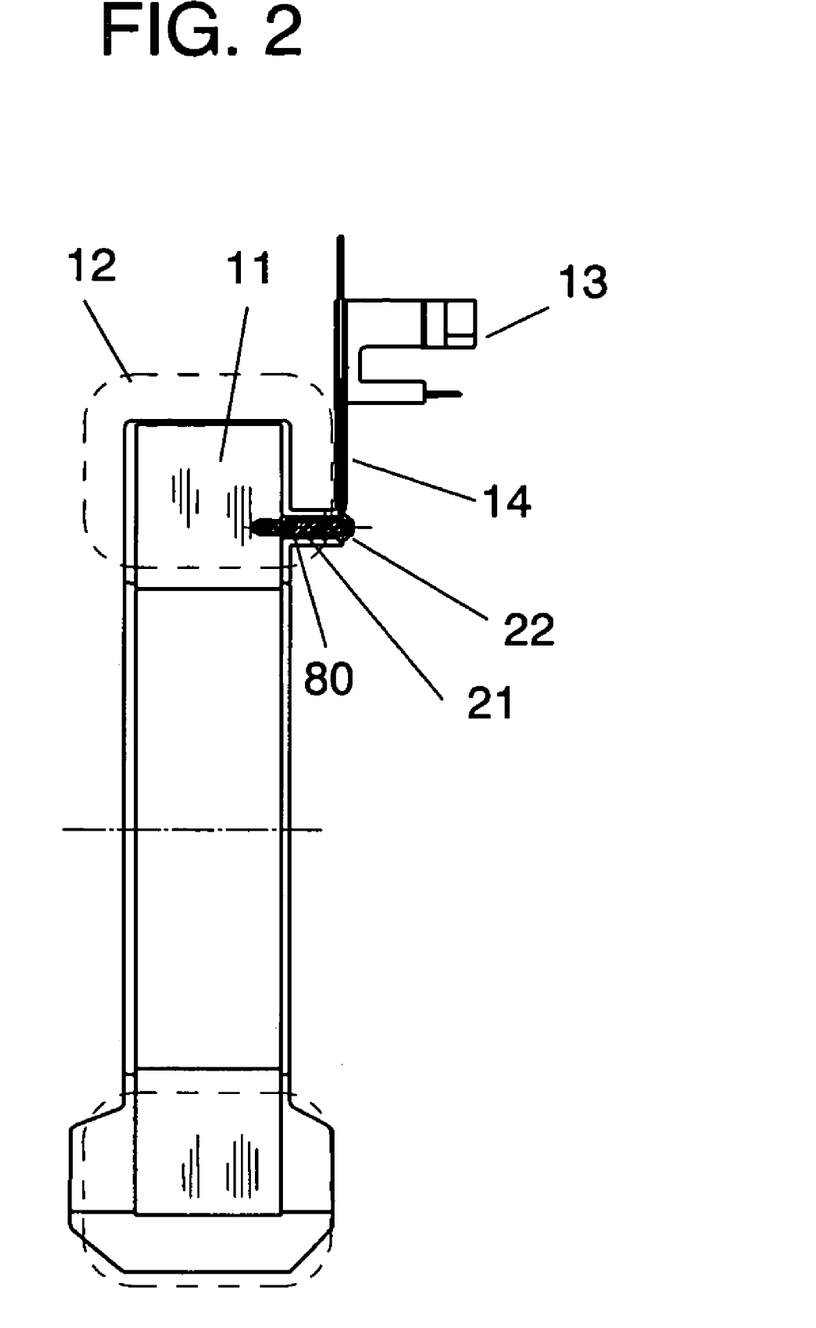
FIG. 2 is a sectional view of the complete product of a winding of a troidal motor indicated in FIG. 1.

Next, a construction in which grounding terminal 14 is electrically connected to teeth 15 through conductive pin 21 is explained in detail with reference to FIG. 2. FIG. 2 is a sectional view of the complete product of winding of the troidal motor indicated in FIG. 1.

In FIG. 2, stator winding 12 is wound on stator core 11. Grounding terminal 14 and connector 13 are mounted on stator winding 12. Hole 80 having a predetermined diameter is provided on teeth 15 of stator core 11. Pin 21 is press fit in hole 80, and this pin 21 and grounding terminal 14 are electrically connected to each other accurately by solder 22 or welding, etc.

In this embodiment, the motor is a toroidal motor, and stator winding 12 is wound from slot 40 of stator core 11 toward the outside diameter of stator core 11. Therefore, because stator winding 12 is wound also on outside diameter side of stator core 11, it is difficult to put out a grounding wire directly from the outside diameter side of stator core 11. On a toroidal motor, however, it is easy to provide hole 80 on teeth 15 as described above and secure a space for press fitting pin 21 in hole 80, as shown in FIG. 1. The present invention is therefore especially effective in the case of a toroidal; motor.

Here, the hole diameter of hole 80 is a predetermined value at which pin 21 can be press fit in hole 80. Moreover, the hole diameter may preferably be a dimension no less than 20% and no more than 40% of the dimension of the width of the teeth 15 of stator core 11.

The hole diameter is explained in detail below.

The setting of the hole diameter is also determined in consideration of production issues such as punching ease, etc., of the stator core. Namely, if the hole diameter is too small, it not only makes it impossible to maintain the function of grounding, but also causes troubles such as bending of the pin at the time of press fitting. Conversely, any excessively large hole diameter may invite deformation of teeth or deterioration of motor characteristics.

Figure 4:
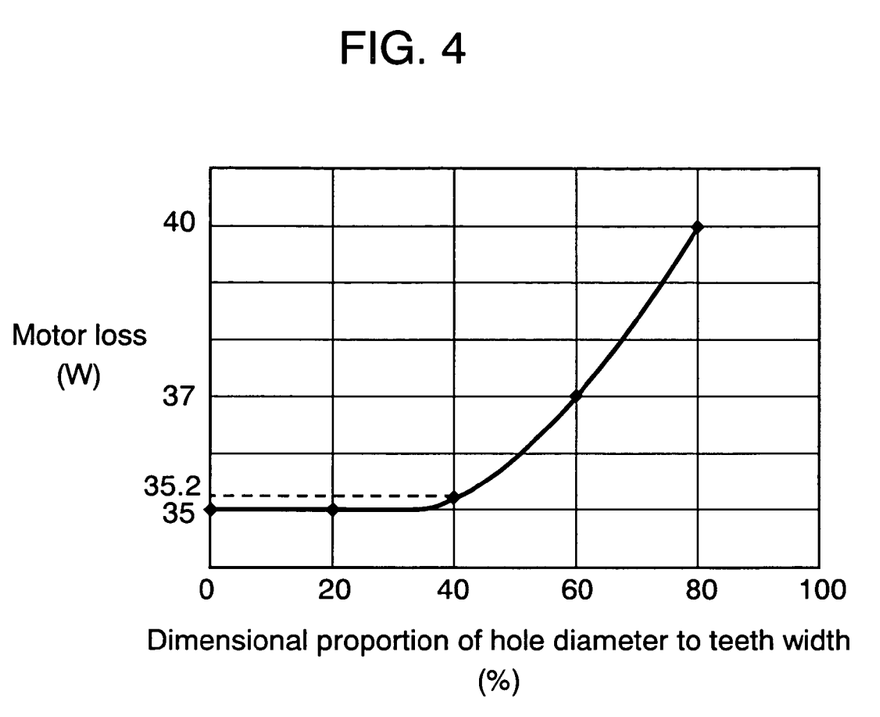
FIG. 4 is a graph showing the relationship between the ratio of hole diameter (provided in the teeth of the motor in an embodiment of the present invention) to teeth width and the motor loss.

FIG. 4 is a graph showing the relationship between the ratio of the diameter of hole 80 provided in teeth 15 of the motor in the embodiment of the present invention to teeth width, and the motor loss. In this graph, the ratio 0% of the axis of abscissa is a state in which no hole for inserting pin 21 is provided on teeth 15. From this graph, it can be seen that the motor loss sharply increases from the point where the dimensional proportion exceeds 40%.

Therefore, it is most suitable for hole 80 to have a hole diameter of no less than 20% and no more than 40% against the dimension of width of teeth 15. By having a hole diameter in this range, it becomes possible to secure a press fitting strength of pin 21 in hole 80, and to keep the amount of motor loss resulting from having hole 80 in teeth 15 at a level almost negligible.

While the number of holes is one in this embodiment, it is also possible to adopt a construction in which to provide a plurality of holes and press fit each conductive pin in each of those holes, and electrically connect those conductive pins with the grounding terminal respectively. In this case, it becomes possible to realize a more reliable motor, because grounding can be secured at a plurality of points.

Figure 3:
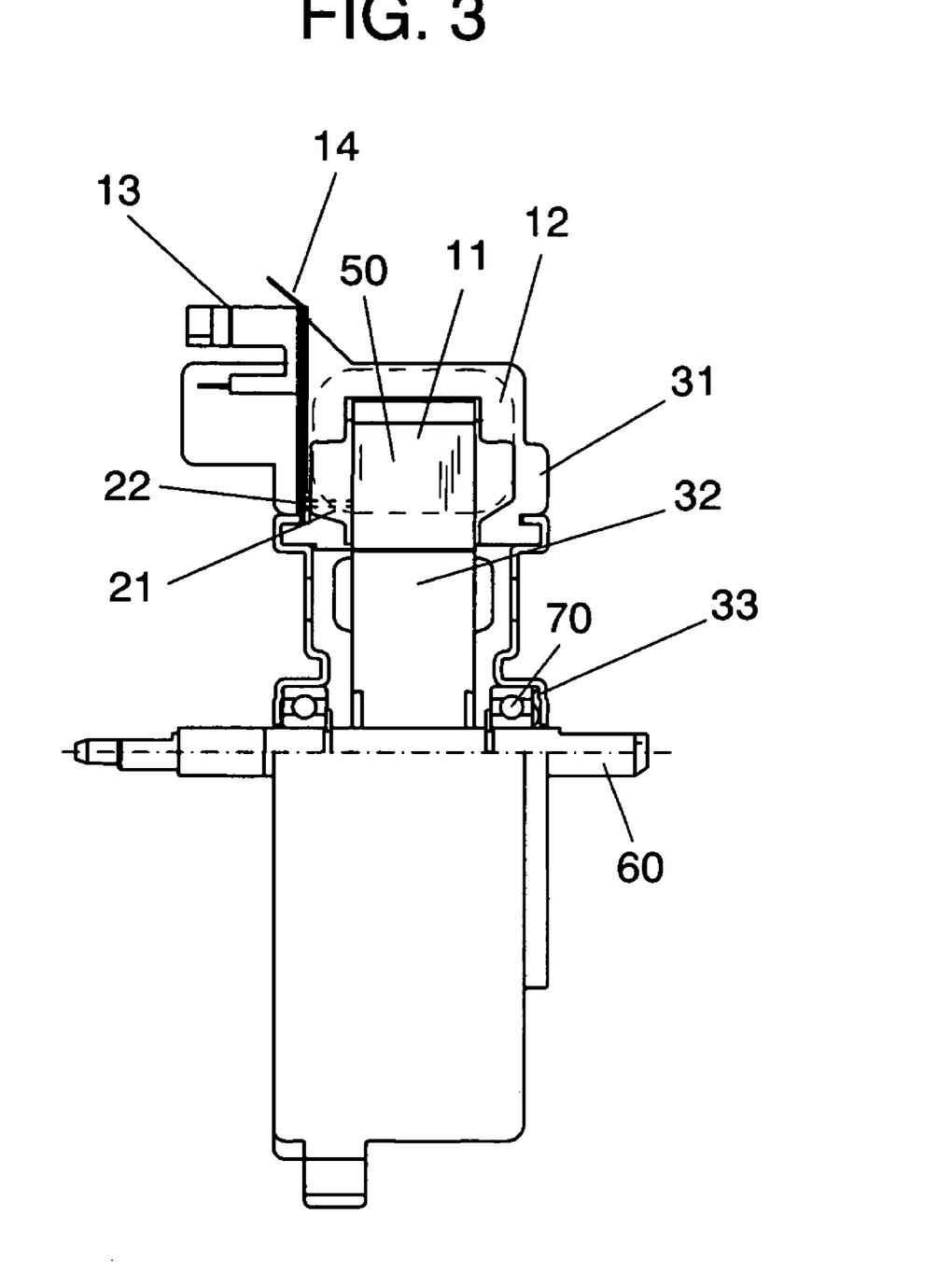
FIG. 3 is a structural sectional view of the troidal motor in the embodiment of the present invention.

FIG. 3 is a structural sectional view of the troidal motor in an embodiment of the present invention.

In FIG. 3, rotor 32 provided with shaft 60 and bearing 70 is inserted on the inside of stator 50 constructed by integrally molding the complete product of winding indicated in FIG. 1 and FIG. 2 by insulating resin 31. After the, bracket 33 is press fit in bearing 70 and stator 50.

Here, stator 50 is formed by integrally molding stator core 11, stator winding 12 wound around stator core 11, grounding terminal 14 mounted on stator winding 12, and a part of connector 13 also mounted on stator winding 12 by insulating resin.

And, as shown in FIG. 1 to FIG. 3, a tip on one side of grounding terminal 14 protrudes to the outside of connector 13, via at least one terminal of connector 13. The tip of the protruding connector 13 is bent from the state of complete product of winding indicated in FIG. 2, in the state of complete product of motor, as shown in FIG. 3.

On the other hand, a tip on other side of grounding terminal 14 is electrically connected to teeth 15 of stator core 11 through conductive pin 21 soldered with solder 22. In this way, the motor is provided with grounding terminal 14 electrically connected to stator core 11 accurately.

In the above explanation, bearing 70 is a ball bearing, and shaft 60 of rotor 32 is press fit in advance in an inner ring of bearing 70, and bracket 33 is press fit later in an outer ring of bearing 70. However, in the case where the bearing is an oil retaining sintered bearing, etc., the bearing is fixed to the bracket in advance, and the rotor shaft is inserted in the bearing later. In either case, the bracket is loaded with a bearing for supporting the shaft.

As is apparent from the above description, the motor in the embodiment of the present invention is a motor suitable for being mounted in a space under a washing tub in a washing machine, or for use near wet environments by being mounted under a cleaning tub in a dish washer, for example. The motor in an embodiment of the present invention is highly waterproof, because the stator is formed with insulating resin. Moreover, at least one hole having a predetermined diameter against a dimension of teeth width is provided in the teeth of a stator core, and a conductive pin is press fit in the hole. And, by fixedly connecting the pin with the grounding terminal by solder or welding, etc., it becomes possible to have a more accurate grounding structure, realizing a highly reliable motor.

Furthermore, by mounting the motor according to the present invention on electric equipment intended for use near wet environments, such as washing machine, dish washer, etc., for example, the electric equipment can be made more reliable.

While, in the explanation of the above-described embodiment, a toroidal motor is chosen for explanation of a motor according to the present invention, the present invention may also be applied to a variety of motors having a stator winding wound around a stator core and having a space enabling provision of at least one hole with a predetermined diameter in the teeth of the stator core, such as a brushless DC motor, an induction motor, a synchronous motor, etc.

Figure 5:
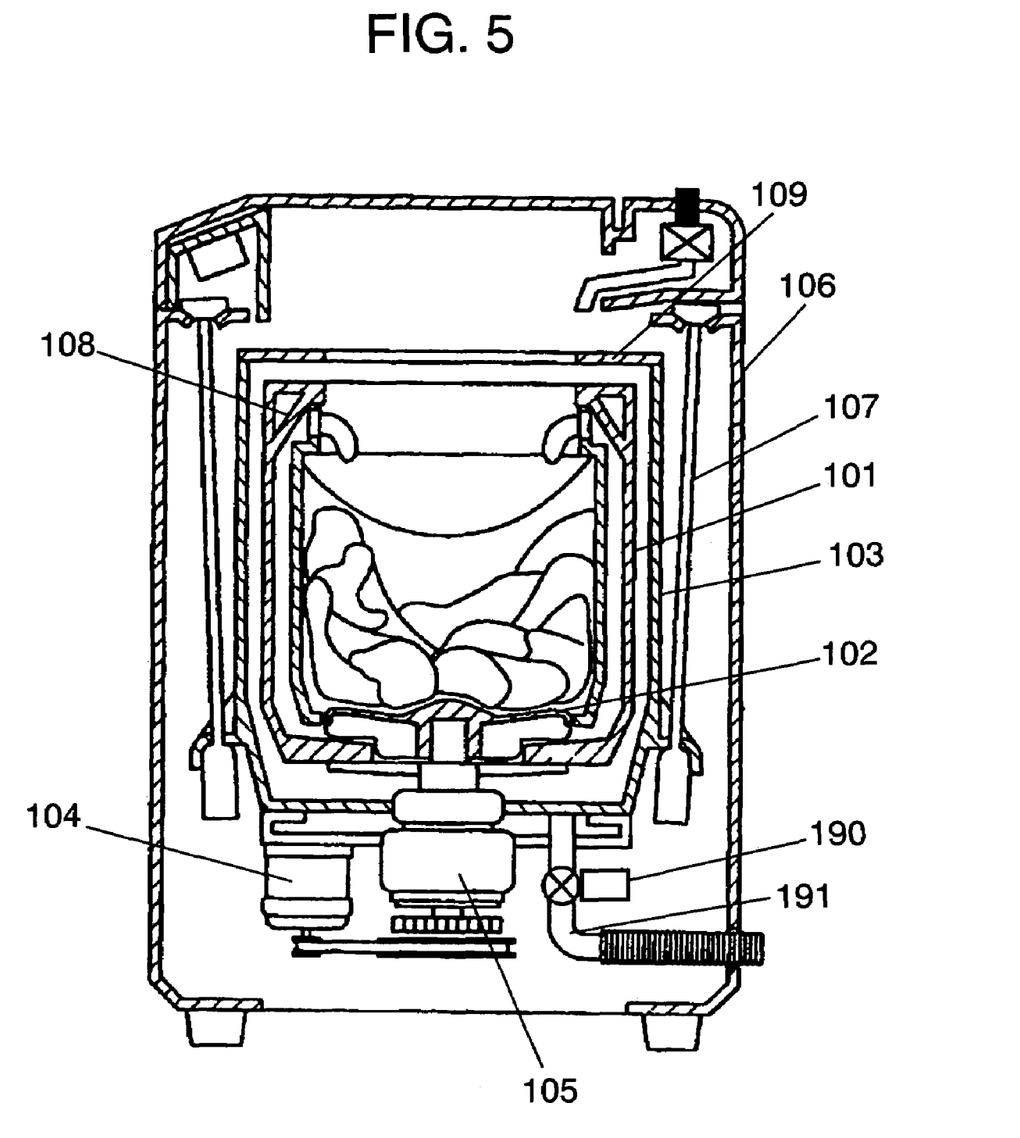
FIG. 5 is a structural sectional view of an electrical equipment (washing machine) in an embodiment of the present invention.

Next, explanation is given of a washing machine as an example of electric equipment in an embodiment of the present invention, with reference to FIG. 5. FIG. 5 is a structural sectional view of the washing machine.

In FIG. 5, washing & dewatering tub 101 (hereinafter referred to as tub 101) is provided with water receiving tub 103 disposed on the outside, and mixing blade (pulsator) 102 disposed on a bottom face. Clutch device 105 is mounted on the bottom face of water receiving tub 103. Driving motor 104 and clutch device 105 are connected to each other by a belt, to transmit the rotational force of motor 104 to tub 101 or mixing blade 102 through clutch device 105. Here, clutch device 105 is switched in a way to transmit the rotational force of motor 104 to mixing blade 102 during washing, and transmit to tub 101 during dewatering.

Still more, water receiving tub 103 is supported for protection against vibration by outer frame 106 through suspension 107. Fluid balancer 108 in which is sealed a liquid is fixed at a top of tub 101. A top part of water receiving tub 103 is covered with water receiving tub cover 109. Under water receiving tub 103 is mounted drain hose 191. Pump motor 190 is mounted by the path of drain hose 191. Pump motor 190 functions in a way to smoothly perform draining by working during drainage. The above-described motor in the embodiment of the present invention can be applied to pump motor 190.

Explanation is given on actions of the washing machine in the embodiment constructed as above.

First, in a washing process, washing solution is put in water receiving tub 103 with the laundry (clothes) introduced into tub 101 and stirred with mixing blade 102, making the washing solution penetrate into the laundry and removing dirt. Next, in a rinsing process, water is put in water receiving tub 103 to rinse the laundry, and mixed with mixing blade 102. Last, in a dehydration process, clutch device 105 is switched to transmit a rotational force of driving motor 104 to tub 101, and centrifugally dehydrate the laundry by turning tub 101. It is so arranged that those processes are controlled one after another, to automatically perform the processes of washing, rinsing, and dewatering.

Here, the water produced in the rinsing process and dewatering process above is discharged through drain hose 191, by the action of pump motor 190.

By adopting the motor of the present invention to pump motor 190, it becomes possible to provide motor 190 with excellent water resisting properties, and enable a more reliable grounding structure, thus realizing a highly reliable motor. As a result, the washing machine in the embodiment of the present invention can also acquire high reliability.

Figure 6:
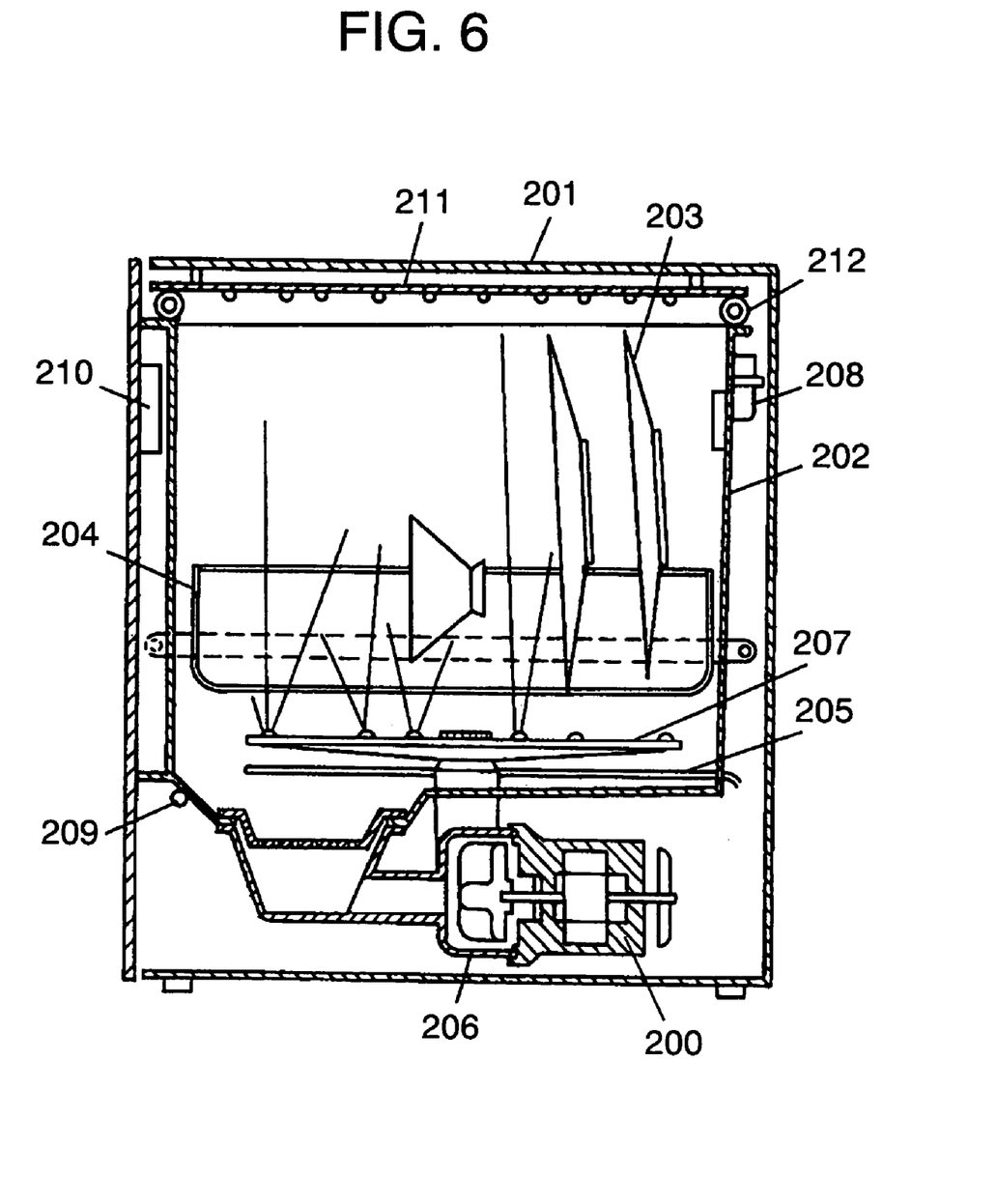
FIG. 6 is a structural sectional view of an electrical equipment (dish washer) in an embodiment of the present invention.

Next, explanation is given of a dish washer as an example of electric equipment in the embodiment of the present invention, with reference to FIG. 6. FIG. 6 is a structural sectional view of the dish washer.

In FIG. 6, dish washer body 201 is open on a front side (left side in the drawing), and is provided with cleaning tub 202 inside. Cleaning tub 202 is open on a top side, and can be pulled out forward in about horizontal direction from dish washer body 201. Dish cage 204 for storing dishes 203 is provided in cleaning tub 202. Cleaning tub 202 is constructed in a way to be drawn out in the forward direction, along rails provided between dish washer body 201 and cleaning tub 202.

Moreover, heater 205 is provided in cleaning tub 202 as heating device for heating cleaning water inside cleaning tub 202. Cleaning pump 206 is provided below cleaning tub 202, so as to clean dishes 203 by injecting cleaning water from cleaning nozzle 207 against them. Cleaning pump 206 is driven by pump motor 200. The above-described motor in the embodiment of the present invention may well be applied to this pump motor 200. Water feed valve 208 is intended to feed tap water to cleaning tub 202. The cleaning water in cleaning tub 202 is discharged with a drainage pump (not shown).

Temperature sensor 209, constituted with thermistor, is mounted on a bottom face of cleaning tub 202, to detect the temperature of the cleaning water in cleaning tub 202. Controller 210 receives a detection signal of temperature sensor 209, detects the temperature of the cleaning water and controls the temperature, and perform temperature control in the drying process. Inner lid 211 is fixed to dish washer body 201 on a top face of cleaning tub 202. This inner lid 211 is provided inside dish washer body 201, so as to cover the opening of cleaning tub 202 when cleaning tub 202 is stored in dish washer body 201. Seal packing 212 is also disposed for closing the opening of cleaning tub 202.

Actions of the above-described dish washer is explained below.

The user pulls out cleaning tub 202 (left side in the drawing), disposes dishes 203 in dish cage 204 and, after storing cleaning tub 202 in dish washer body 201, starts operation. Controller 210 controls operation of heater 205, cleaning pump 206, water feed valve 208, drainage pump, etc., and the dish washer performs cleaning, rinsing and drying of dishes 203.

On a dish washer of such construction, cleaning water sticks to a back face of inner lid 211 during a cleaning operation. If cleaning tub 202 is pulled out on the front side, the cleaning water sticking to the back face of inner lid 211 drops inside on a bottom face of dish washer body 201, and the dropped water splashes on pump motor 200. Therefore, pump motor 200 is required to be water resistant. Adopting the motor of the present invention to pump motor 200 is quite suitable, because it uses a stator made by integrally forming a stator core and a stator winding with insulating resin and has excellent water resistance. In addition, the motor enables a more reliable grounding structure, providing a highly reliable motor.

As explained above, the motor of the present invention can be adopted for a pump motor to be mounted at the bottom of the cleaning tub for injecting water onto dishes in a dish washer. The motor enables a more reliable grounding structure, providing a highly reliable motor and, as a result, the dish washer in the embodiment of the present invention can also acquire high reliability.

INDUSTRIAL APPLICABILITY

The motor according to the present invention has a stator formed by integrally molding a stator core, a stator winding wound around the stator core, and a grounding terminal mounted on the stator winding by an insulating resin; a rotor provided with a shaft; a bracket mounting a bearing for supporting the shaft; and a conductive pin press fit in at least one hole having a predetermined diameter provided in the teeth of the stator core. The pin and the grounding terminal are electrically connected to each other. Due to this construction, this motor realizes an accurate grounding structure, and is suitable for being mounted on electric equipment such as, a washing machine, a dish washer, etc., intended for using water.

The invention claimed is:

1. A toroidal motor comprising:
   a stator including
      a stator core having a yoke and a plurality of teeth extending from an inside circumference of the yoke, the stator core having a slot therein,
      a stator winding wound on the yoke of the stator core toward an outside circumference of the yoke from the slot in the stator core,
      a grounding terminal mounted on the stator winding, the grounding terminal having a first end protruding toward the outside circumference of the yoke, and
      a conductive pin electrically connecting the grounding terminal to the stator core;
   a rotor provided with a shaft; and
   a bracket for receiving a bearing which rotatably supports the shaft,
   wherein at least one hole is provided in the stator core, the hole having a predetermined diameter and being provided in a tooth of the plurality of teeth of the stator core,
   wherein a first end of the conductive pin is press fitted in the hole and a second end of the conductive pin is connected with a second end of the grounding terminal,
   wherein the grounding terminal extends along the yoke from the second end connected to the conductive pin so that a side of the grounding terminal faces the yoke, and
   wherein the stator is formed by integrally molding the stator core, the stator winding, the grounding terminal, and the conductive pin with an insulating resin.

2. The motor as defined in claim 1, wherein the predetermined diameter of the hole is no less than 20% and no more than 40% of a dimension of the width of one of the teeth.

3. The motor as defined in claim 1, further comprising a connector mounted on the stator winding, wherein one side of the grounding terminal protrudes to outside of the connector via a terminal of the connector.

4. The motor as defined in claim 3, wherein a part of the connector is integrally molded by insulating resin.

5. An electric device comprising:
   the motor as defined in claim 1; and
   a unit powered by the motor.

6. An electric device comprising:
   the motor as defined in claim 2; and
   a unit powered by the motor.

7. An electric device comprising:
   the motor as defined in claim 3; and
   a unit powered by the motor.

8. An electric device comprising:
   the motor as defined in claim 4; and
   a unit powered by the motor.

9. The motor as defined in claim 1, wherein the grounding terminal includes a portion in a shape of a crank.

10. The motor as defined in claim 4, wherein a tip of the first end of the grounding terminal protrudes to the outside of the insulating resin via the connector.

* * * * *